United States Patent [19]

Wick

[11] Patent Number: 5,746,250
[45] Date of Patent: May 5, 1998

[54] PORTABLE AUTOMATIC SPRINKLING SYSTEM

[76] Inventor: John Leslie Wick, 1661 Highway 31 South, Franklin, Ind. 46131

[21] Appl. No.: 612,547

[22] Filed: Mar. 8, 1996

[51] Int. Cl.⁶ ................................................ A01G 27/00
[52] U.S. Cl. ...................... 137/624.11; 239/69; 137/382
[58] Field of Search ........................... 137/624.11, 382; 239/69, 70

[56] References Cited

U.S. PATENT DOCUMENTS

| | | |
|---|---|---|
| 2,637,469 | 5/1953 | Clay, Jr. . |
| 3,286,733 | 11/1966 | Hunter . |
| 3,386,460 | 6/1968 | Dean . |
| 3,865,138 | 2/1975 | Jones . |
| 4,012,673 | 3/1977 | Saarem et al. ............... 137/624.11 X |
| 4,256,133 | 3/1981 | Coward et al. ............... 137/624.11 X |
| 4,548,225 | 10/1985 | Busalacchi . |
| 4,592,505 | 6/1986 | Bruninga et al. . |
| 4,633,905 | 1/1987 | Wang . |
| 4,708,162 | 11/1987 | Bayat . |
| 4,722,478 | 2/1988 | Fletcher et al. . |
| 4,791,948 | 12/1988 | Bayat . |
| 4,797,820 | 1/1989 | Wilson et al. . |
| 4,807,664 | 2/1989 | Wilson et al. . |
| 4,834,143 | 5/1989 | Bayat . |
| 4,858,827 | 8/1989 | Fletcher et al. . |
| 5,522,420 | 6/1996 | Martin .......................... 137/382 X |

*Primary Examiner*—Kevin Lee
*Attorney, Agent, or Firm*—Kyle S. Brant

[57] ABSTRACT

A programmable automatic sprinkling system includes a housing, a cover, a fluid manifold, and a plurality of programmable valve controllers each including a fluid valve, an inlet fitting and an outlet fitting. The fluid manifold includes several fluid outlet fittings or ports and an inlet fitting that is attached to a source of pressurized water. The inlet fitting of each programmable valve controller is fluidly connected to an outlet fitting of the manifold. The programmable valve controllers are self-contained controllers each having a motor actuated valve, a power source such as a battery, and a microprocessor based controller that includes an input keyboard and a display that provides visual feedback to the user regarding the state of the controller and timer program information. An alternate embodiment of the programmable automatic sprinkling system includes a single programmable controller that actuates a plurality of motor actuated valves. The controller includes microprocessor based system having a keyboard and display for inputting program information such as open and close times for the valves of the system.

18 Claims, 4 Drawing Sheets

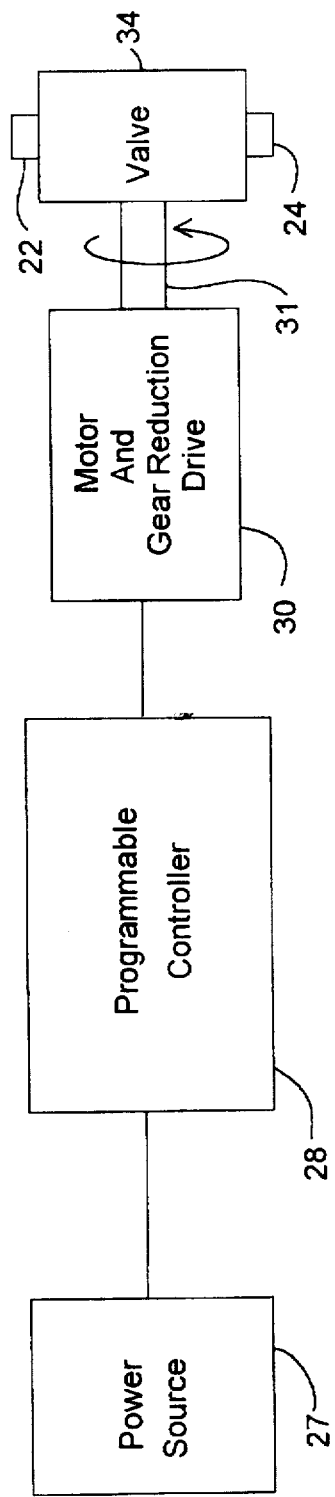
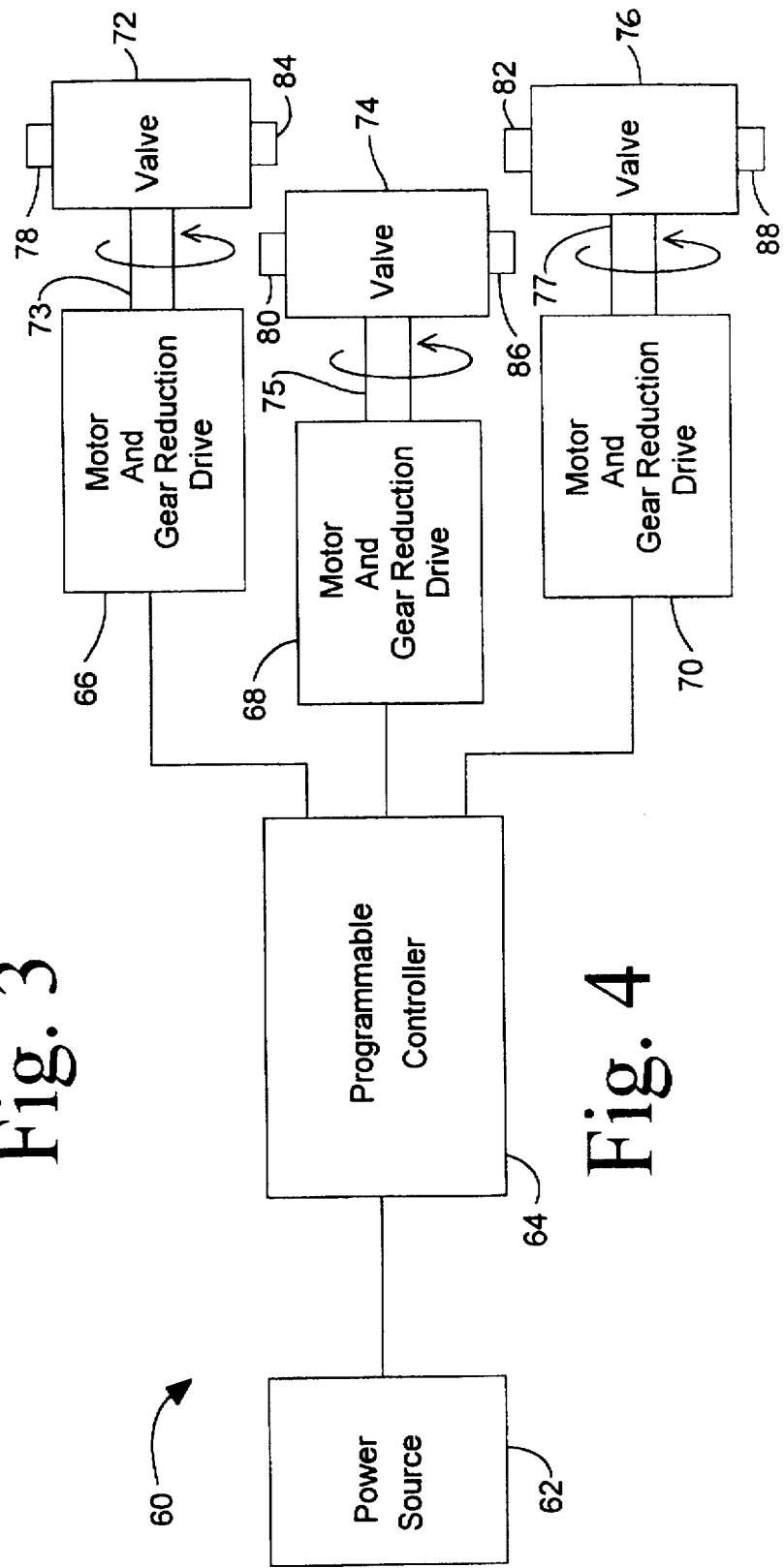

PORTABLE AUTOMATIC SPRINKLING SYSTEM

FIELD OF THE INVENTION

This invention relates in general to water sprinkling devices and more specifically to a portable automatic water sprinkling system that includes programmable features and is self-powered.

BACKGROUND OF THE INVENTION

Automatic lawn sprinkling systems are well known in the art, and many patents have been granted for such devices. Single valve programmable sprinkling devices are readily available from a number of sources. Examples of such devices are shown in the following patents: U.S. Pat. No. 4,633,905 to Wang; U.S. Pat. No. 4,807,664 to Wilson et al.; U.S. Pat. No. 3,865,138 to Jones; U.S. Pat. No. 4,592,505 to Bruninga et al.; U.S. Pat. No. 4,797,820 to Wilson et al.; and U.S. Pat. Nos. 4,722,478 and 4,858,927 to Fletcher et al.

Portable lawn sprinkling systems that include a programmable timer and multiple control valves are more recent in the development of the art. Examples of such devices are shown in the following patents: U.S. Pat. Nos. 4,791,948, 4,834,143, and 4,708,162 to Bayat.

Portable lawn sprinkling systems are useful in circumstances wherein a permanent installation of a sprinkling system is not warranted either due to economic circumstances, or where only a temporary need for such a system exists. One example of such a circumstance is new home construction sites wherein a lot is seeded or sodded and frequent periodic watering of the ground is necessary for the new grass to properly develop over a period of several weeks. Another example is the need for frequent sprinkling of a localized area on a golf course where the course has been modified or where the course has been repaired, and the built-in sprinkling system of the course is not well equipped to handle the specific watering needs of the localized area. Yet another example of the need for a portable sprinkling system is the need for water in a vegetable garden during periods of drought that may take place during the hot summer months. As some vegetable crops require more water than other types of vegetables, the ability to regulate total water quantities delivered to specific areas is desired. Still another example of temporary watering needs occurs when new flowers are planted in flower beds and frequent watering is necessary to stimulate growth of the new plants. Permanent installations of sprinkling systems are generally speaking a costly alternative for a homeowner who is unable to justify the expense of hardware and installation.

One significant disadvantage of the prior art portable sprinkling system is the need for a power source in such devices to provide the necessary electricity for programmable controllers and control valves. The systems of the Bayat patents use solenoid control valves. Such valves typically require a 24 volt AC power signal. Thus, a 120 volt AC signal and an AC transformer is necessary in systems such as those shown in the Bayat Patents. Alternatively, an AC power signal supplied via a lengthy cable may be used in the Bayat systems. The power signal requirements of such sprinkling systems present a disadvantage to the user in that a power cable of sufficient length to reach the device is required. A further disadvantage of the Bayat devices is the potential shock hazard that exists when a power source cable is routed to the portable device. In view of the potential liability to innocent trespassers and the "attractive nuisance" nature of an exposed power cable, it is highly desirable to reduce the risk of loss or personal injury which may result from a shock hazard.

A portable automatic sprinkling system that includes multiple valves, a programmable timer, and that is completely self-powered is thus needed.

SUMMARY OF THE INVENTION

A portable automatic sprinkling system, according to one aspect of the present invention, includes a housing including a plurality of lateral surfaces that define an upper opening in the housing, the lateral surfaces further defining a lower opening in the housing, a cover, adapted to mate with and be disposed within the upper opening of the housing, a fluid manifold mounted within the housing and having a fluid inlet fitting and a plurality of fluid outlet fittings, a power source mounted within the housing that produces a DC power signal, and a plurality of programmable valve controllers mounted within the housing, wherein each of the programmable valve controllers includes a power connection connected to the DC power signal, a programmable timer that produces a valve activation signal, a motor responsive to the valve activation signal, a valve having an inlet fitting, an outlet fitting and a fluid conduit fluidly connecting the inlet fitting and the outlet fitting, a flow control mechanism disposed within the fluid conduit and coupled to the motor, the motor positioning the flow control mechanism in response to the valve activation signal to enable and disable fluid flow from the inlet fitting to the outlet fitting, and wherein the inlet fitting of each valve is fluidly coupled to one of the plurality of fluid outlet fittings of the manifold.

A portable automatic sprinkling system according to another aspect of the present invention includes a housing including a plurality of lateral surfaces that define an upper opening in the housing, the lateral surfaces further defining a lower opening in the housing, a cover, adapted to mate with and be disposed within the upper opening of the housing, a fluid manifold mounted within the housing and having a fluid inlet fitting and a plurality of fluid outlet fittings, a power source that produces a DC power signal, programmable timer means for producing a plurality of valve activation signals in accordance with a preprogrammed timing algorithm, and a plurality of valve actuator means each including a motor responsive to one of the plurality of valve activation signals, a valve having an inlet fitting, an outlet fitting and a fluid conduit fluidly connecting the inlet fitting and the outlet fitting, a flow control mechanism disposed within the fluid conduit and having a positioning shaft coupled to the motor, the motor positioning the shaft in response to the valve activation signal to enable and disable fluid flow from the inlet fitting to the outlet fitting, and wherein the inlet fitting of each valve is fluidly coupled to one of the plurality of fluid outlet fittings of the manifold.

One object of the present invention is to provide an improved portable automatic sprinkling system.

Another object of the present invention is to eliminate the need for an external power source necessary in portable sprinkling systems of the prior art.

Yet another object of the present invention is to provide anti-theft deterrent features in the disclosed portable automatic sprinkling system.

Still another object of the present invention is to provide a fully self-contained portable sprinkling system usable wherever a source of pressurized water is available.

A further object of the present invention is to provide a portable automatic sprinkling system that is more economical to manufacture, readily stalled and removed by the user, and is readily serviced and repaired by the user thereof.

An additional object of the present invention is to provide a portable automatic sprinkling system with increased user safety by utilizing low voltage DC powered components as opposed to components that require 120 VDC power and which present a shock hazard when used in the vicinity of sprinkled water.

These and other object of the present invention will become more apparent from the following description of the preferred embodiments.

BRIEF DESCRIPTION OF THE DRAWINGS

FIG. 3 is a diagrammatic illustration of the programmable valve controller shown in FIGS. 1 and 2.

FIG. 4 is a diagrammatic illustration of another embodiment of a portable automatic sprinkling system according to the present invention.

DESCRIPTION OF THE PREFERRED EMBODIMENT

Figure 1:
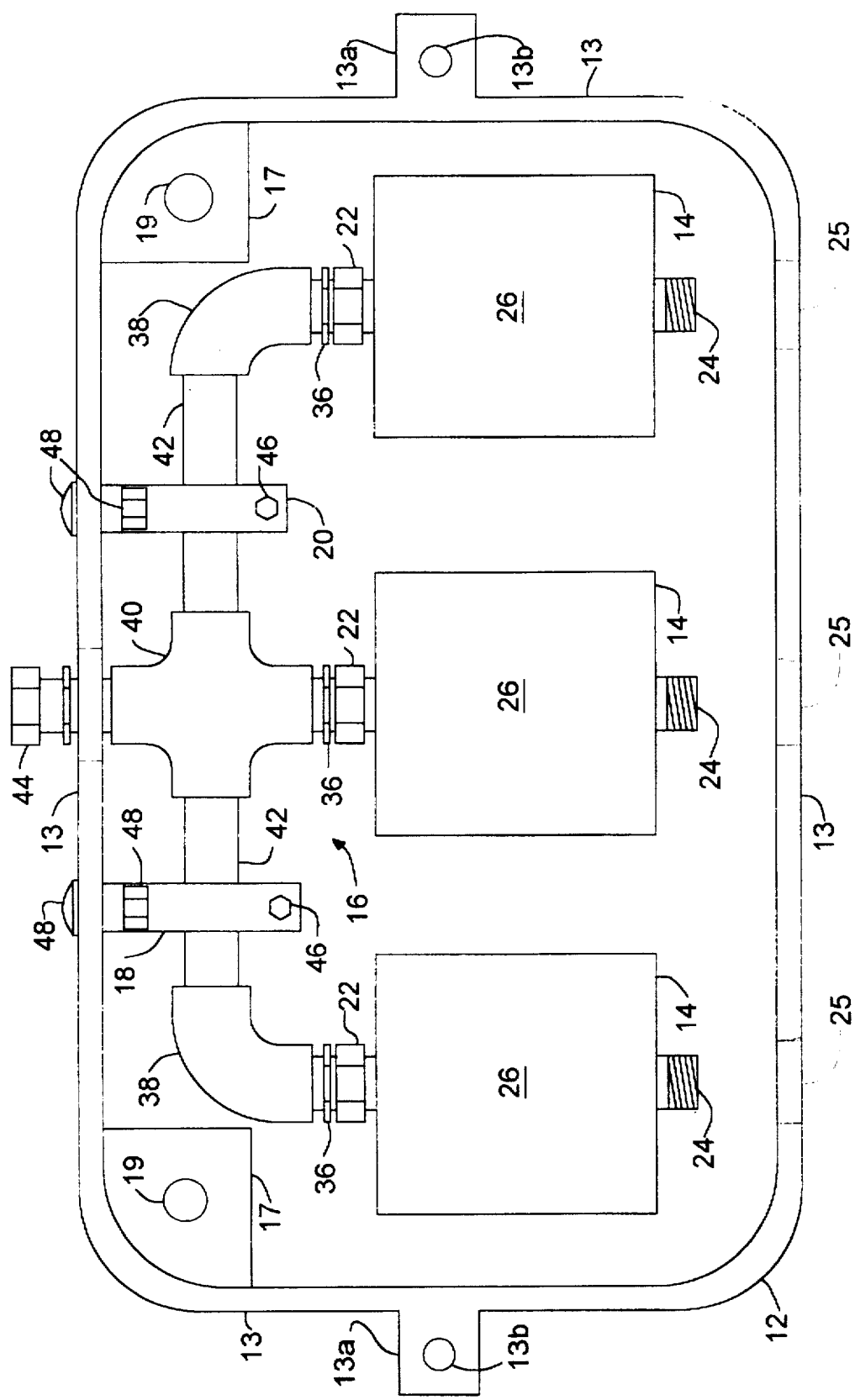
FIG. 1 is a plan view of one embodiment of a portable automatic sprinkling system according to one aspect of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
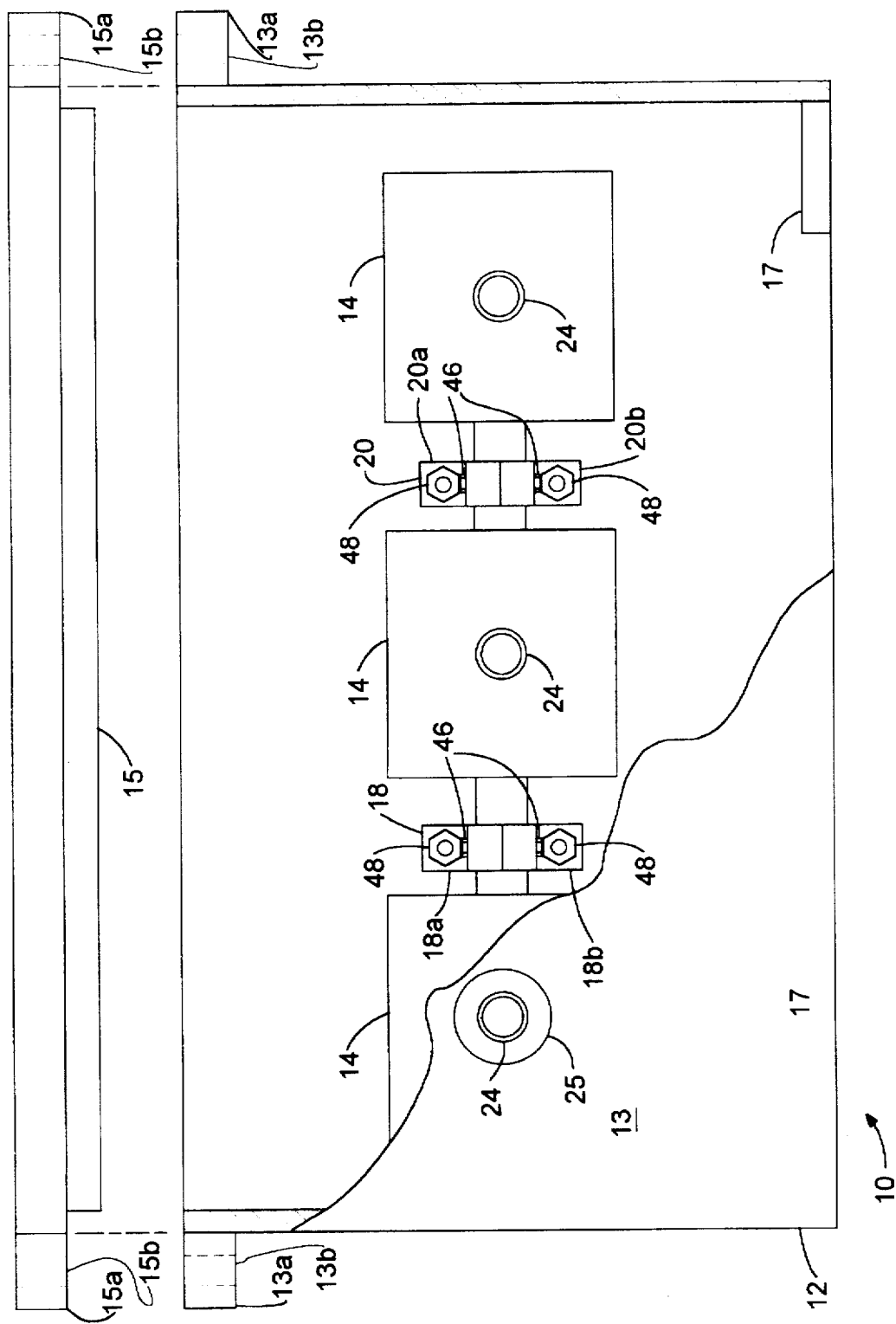
FIG. 2 is a cut-away front elevational view of the portable automatic sprinkling system of FIG. 1.

Referring now to FIGS. 1 and 2, a portable automatic sprinkling system 10, according to the present invention, is shown. The system 10 includes a housing 12, three programmable valve controllers 14, a manifold 16, and mounting brackets 18 and 20. Each programmable valve controller includes an inlet fitting 22, an outlet fitting 24, and a housing 26 within which are contained a power source or battery 27, a programmable controller 28, a motor and gear reduction drive 30 and a valve 34 (items 27, 28, 30, and 34 are shown in FIG. 3).

Housing 12 includes lateral surfaces 13 and is open on the top and bottom surfaces. A cover 15 is matably inserted into the top of housing 12 and provides a protective cover for the system 10. Housing 12 also includes anchor tabs 17. Anchor tabs 17 include holes 19 suitable for receiving an anchoring device (not shown) so that the housing 12 may be securely attached to the ground upon which it rests from within housing 12, thereby providing an anti-theft deterrent mechanism. Housing 12 also includes several apertures typical of aperture 25 wherein garden hoses and the like are routed through the lateral surfaces 13 to the outlet fittings 24. Another aperture in housing 12 (not shown) provides a porthole for fitting 44 to connect with four way adapter fitting 40. Ears 13a extending outward from lateral surfaces 13 mate and align with ears 15a of cover 15. Apertures 13b in ears 13a align with apertures 15b in ears 15a through which a padlock (not shown) may be installed to prevent unauthorized access to the internal area of housing 12. Housing 12 is preferably made from a non-metallic compound such as a polymer to prevent rust and corrosion.

Manifold 16 is comprised of threaded adapter fittings 36, elbow fittings 38, a four way adapter fitting 40, pipe sections 42, and garden hose adapter fitting 44. Pipe sections 42 fluidly connect the elbow fittings 38 with the four way adapter fitting 40. Inlet fitting 22 is a standard female garden hose fitting (typically ⅝ inch) and adapter fitting 36 is matably attached to inlet fitting 22. A garden hose (not shown) is fluidly attached to garden hose adapter fitting 44, and provides a source of pressurized water to manifold 16. Manifold 16 functions as a fluid conduit for pressurized water supplied to inlet fittings 22 of each programmable valve controller 14. Fittings 36, elbows 38, four way adapter 40 and pipe sections 42 are standard PVC plumbing fixtures, or may be cast iron/steel plumbing fixtures.

Brackets 18 and 20 include an upper half 18a and 20a, and a lower half 18b and 20b, respectively, that surround pipe sections 42 and firmly clamp onto pipe sections 42. Standard nut and bolt fasteners 46 attach the upper and lower halves of brackets 18 and 20 to each other about pipe section 42. Brackets 18 and 20 are attached to housing 12 with nut and bolt fasteners 48. It is contemplated that any of a number of mounting techniques well known in the art may be used to attach the manifold 16 to housing 12, and such need not be further discussed at this time.

Operationally speaking, the portable automatic sprinkling system 10 is attached to a source of pressurized water at inlet fitting or garden hose adapter fitting 44. Three separate garden hoses (not shown) are attached to the outlet fitting 24 of each programmable valve controller 14. Sprinkling devices (not shown) are attached to the distal end of each of the garden hoses (not shown). Each of the programmable valve controllers 14 is preprogrammed by the user to activate and deactivate the internal valves 34 (FIG. 3) at desired timed intervals in accordance with the water needs of a particular area. The depicted embodiment of system 10 includes three programmable valve controllers 14, however, it is contemplated that the quantity of programmable valve controllers may be expanded as the need for such dictates system expansion.

Figure 5:
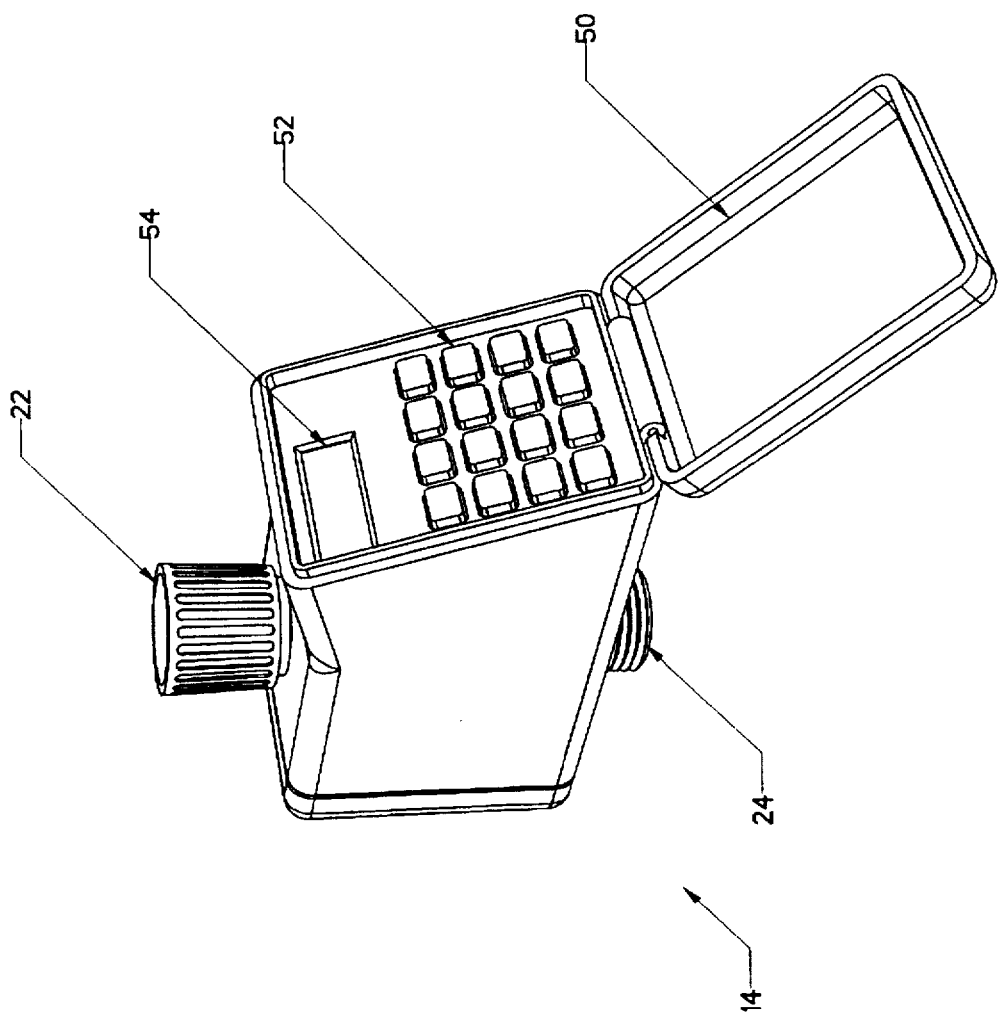
FIG. 5 is a detailed illustration of the programmable valve controller of FIG. 3.

Referring now to FIG. 5, a more detailed illustration of the physical features of each programmable valve controller 14 is shown. Each programmable valve controller 14 includes an inlet fitting 22, an outlet fitting 24, a hinged cover 50, a keyboard 52, and a display 54. A microprocessor based programmable controller (depicted in FIG. 3) receives user input via keyboard 52, and display 54 provides feedback to the user on entered data and program settings. More detailed descriptions of such programmable valve controllers are found in U.S. Pat. No. 4,797,820 to Wilson et al., and in U.S. Pat. No. 4,807,664 to Wilson et al., the contents of which are both incorporated by reference. Referring now to FIG. 3, a diagrammatic illustration of the programmable valve controller 14 is shown. Programmable valve controller 14 includes a power source 27 that supplies a DC power signal to programmable controller 28. Preferably, power source 27 is a standard battery cell such as a "C" or "D" cell, readily available from most retail outlets. Programmable controller 28 includes a microprocessor based microcomputer or microcontroller (not shown), keyboard 52 and display 54, the details of which are well known in the art. Motor and gear reduction drive 30 receives a valve activation signal or position signal from programmable controller 28 in accordance with programming information entered into the programmable controller 28 by the user. In response to the activation signals produced by the programmable controller 28, motor and gear reduction drive 30 rotates shaft 31 to open and close valve 34 in accordance therewith. Also depicted in FIG. 3 are inlet fitting 22 and outlet fitting 24 of valve 34. A mechanically actuated valve such as valve 34 combined with a motor/gear reduction drive significantly reduces the total power consumption necessary to open and close valve 34 as compared with solenoid actuated valve sprinkling systems, and thus results in a truly portable automatic sprinkling system.

The diagrammatic illustration of FIG. 4 depicts yet another embodiment of a portable automatic sprinkling system 60 according to the present invention. Portable automatic sprinkling system 60 includes a power source 62, a programmable controller 64, three motor and gear reduction drive units 66, 68 and 70, and three corresponding mechanically actuated valves 72, 74 and 76. Each of valves 72, 74 and 76 includes an inlet fitting (items 78, 80 and 82, respectively) an outlet fitting (items 84, 86 and 88, respectively), and a shaft (items 73, 75, 77 respectively) coupled to the internal flow control mechanism within the valves. Programmable controller 64 includes the identical internal components of programmable controller 28 (notably a microcontroller, a keyboard, and a display), with the primary difference being that controller 64 produces a plurality of unique activation signals in accordance with information programmed into the controller 64 by the user to control several mechanically actuated fluid valves such as valves 72, 74 and 76. Again, by utilizing a mechanically actuated valve (items 72, 74 and 76) instead of a solenoid actuated valve, the long term power consumption of the system 60 is significantly reduced in comparison with the devices of the prior art.

The portable automatic sprinkling system 60 is situated in a housing such as that shown in FIGS. 1 and 2, and includes a manifold typical of manifold 16. Brackets such as brackets 18 and 20 are used to attach the manifold to the housing of system 60 to the housing. Alternatively, individual garden hoses may be used instead of a manifold, and a four way splitter fitting adaptable for use with garden hoses substitutes for the four way plumbing fitting 40 of system 10 that provides a source of pressurized water to the inlet valves 78, 80, and 82 of valves 72, 74, 76, respectively.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A portable automatic sprinkling system comprising:

a housing including a plurality of lateral surfaces that define an upper opening in said housing, said lateral surfaces further defining a lower opening in said housing;

a cover, adapted to mate with and be disposed within said upper opening of said housing;

a fluid manifold mounted within said housing and having a fluid inlet fitting and a plurality of fluid outlet fittings;

a power source mounted within said housing that produces a DC power signal; and a plurality of programmable valve controllers mounted within said housing, said programmable valve controllers including a power connection connected to said DC power signal, a programmable timer that produces a valve activation signal, a motor responsive to said valve activation signal, a valve having an inlet fitting, an outlet fitting and a fluid conduit fluidly connecting said inlet fitting and said outlet fitting, a flow control mechanism disposed within said fluid conduit and coupled to said motor, said motor positioning said flow control mechanism in response to said valve activation signal to enable and disable fluid flow from said inlet fitting to said outlet fitting, and wherein the inlet fitting of each valve is fluidly coupled to one of said plurality of fluid outlet fittings of said manifold.

2. The portable automatic sprinkling system of claim 1 including a plurality of power sources each producing a DC power signal that is supplied to a corresponding one of each of said plurality of programmable valve controllers.

3. The portable automatic sprinkling system of claim 2 wherein said plurality of power sources are standard battery cells.

4. The portable automatic sprinkling system of claim 1 wherein said motor includes a gear reduction drive having an input shaft and an output shaft, said output shaft coupled to the input shaft of said gear reduction drive, and said output shaft of said gear reduction drive is coupled to said flow control mechanism.

5. The system of claim 4 including anti-theft means situated within said housing for preventing removal of said system, wherein said anti-theft means includes means for securely attaching said housing to earth situated beneath said housing and said cover includes means for securely locking said cover onto said housing.

6. The system of claim 5 wherein said anti-theft means is a member extending inward from one of said lateral surfaces of said housing, said member having an aperture defined therein.

7. A portable automatic sprinkling system comprising:

a housing including a plurality of lateral surfaces that define an upper opening in said housing, said lateral surfaces further defining a lower opening in said housing;

a cover, adapted to mate with and be disposed within said upper opening of said housing;

a fluid manifold mounted within said housing and having a fluid inlet fitting and a plurality of fluid outlet fittings;

a power source that produces a DC power signal;

programmable timer means for producing a plurality of valve activation signals in accordance with a preprogrammed timing algorithm;

a plurality of valve actuator means each including a motor responsive to one of said plurality of valve activation signals, a valve having an inlet fitting, an outlet fitting and a fluid conduit fluidly connecting said inlet fitting and said outlet fitting, a flow control mechanism disposed within said fluid conduit and having a positioning shaft coupled to said motor, said motor positioning said shaft in response to said valve activation signal to enable and disable fluid flow from said inlet fitting to said outlet fitting and, fluid coupling means to fluidly connect the inlet fitting of each valve to a corresponding one of said plurality of fluid outlet fittings of said manifold.

8. The system of claim 7 wherein said motor includes a gear reduction drive having an input shaft and an output shaft, said output shaft coupled to the input shaft of said gear reduction drive, and said output shaft of said gear reduction drive is coupled to a corresponding one of said positioning shafts.

9. The system of claim 8 wherein said housing includes anti-theft means for preventing removal of said system, wherein said anti-theft means includes means for attaching said housing to earth situated beneath said housing, said means for attaching disposed within said housing, said anti-theft means further including means for securely locking said cover onto said housing.

10. The system of claim 9 wherein said anti-theft means is a member extending inward from one of said lateral surfaces of said housing, said member having an aperture defined therein.

11. The system of claim 10 wherein said power source is a standard battery cell.

12. A portable automatic sprinkling system comprising:

a housing including a plurality of lateral surfaces that define an upper opening in said housing, said lateral surfaces further defining a lower opening in said housing;

a cover, adapted to mate with and be disposed within said upper opening of said housing;

means for producing a DC power signal;

a plurality of control means for producing a plurality of activation signals in accordance with a predetermined timing requirement;

a plurality of motor means each responsive to one of said plurality of activation signals, each of said motor means including an output shaft rotatable in accordance with said one of said plurality of activation signals;

a plurality of valve means each having a control shaft, an inlet port and an outlet port, said valve means enabling and disabling fluid flow from said inlet port to said outlet port in accordance with the position of said control shaft, and said control shaft of each of said plurality of valve means is mechanically coupled to a corresponding one of said output shafts of said plurality of motor means; and manifold means for supplying pressurized fluid to each one of said inlet ports of said plurality of valve means.

13. The system of claim 12 including anti-theft means for preventing removal of said system, wherein said anti-theft means includes means disposed within said housing for securely attaching said housing to earth situated beneath said housing and said cover includes means for securely locking said cover onto said housing.

14. The system of claim 12 wherein each of said plurality of motor means includes a gear reduction drive having an input shaft and an output shaft, said output shaft coupled to the input shaft of said gear reduction drive, and said output shaft of said gear reduction drive is coupled to said control shaft of said valve means.

15. A portable automatic sprinkling system comprising:

a housing including a plurality of lateral surfaces that define an upper opening in said housing, said lateral surfaces further defining a lower opening in said housing;

a cover, adapted to mate with and be disposed within said upper opening of said housing;

a fluid manifold mounted within said housing and having a fluid inlet fitting and a plurality of fluid outlet fittings;

a self-contained power source that produces a DC power signal;

programmable timer means for producing a plurality of valve activation signals in accordance with a preprogrammed timing algorithm, said programmable timer means including a power input connection connected to said DC power signal; and a plurality of valve actuator means each responsive to one of said plurality of valve activation signals and including a valve having an inlet fitting, an outlet fitting and a fluid conduit fluidly connecting said inlet fitting and said outlet fitting, flow control means disposed within said fluid conduit to enable and disable fluid flow from said inlet fitting to said outlet fitting, said valve actuator receiving power from said DC power signal and the inlet fitting of each of said valves is fluidly coupled to one of said plurality of fluid outlet fittings of said manifold.

16. The system of claim 15 wherein said self-contained power source is a standard battery cell.

17. The system of claim 16 including anti-theft means for preventing removal of said system, said anti-theft means being disposed within said housing and including means for attaching said housing to earth situated beneath said housing, said device also including means for securely locking said cover onto said housing.

18. The system of claim 17 wherein said anti-theft means is a member extending inward from one of said lateral surfaces of said housing, said member having an aperture defined therein.

* * * * *